United States Patent [19]

Reinartz et al.

[11] Patent Number: 4,564,244
[45] Date of Patent: Jan. 14, 1986

[54] PRESSURE CONTROL DEVICE

[75] Inventors: Hans-Dieter Reinartz, Frankfurt am Main; Helmut Steffes, Eschborn, both of Fed. Rep. of Germany

[73] Assignee: ITT Industries, Inc., New York, N.Y.

[21] Appl. No.: 562,197

[22] Filed: Dec. 16, 1983

[30] Foreign Application Priority Data

Jan. 21, 1983 [DE]  Fed. Rep. of Germany ....... 3301901

[51] Int. Cl.$^4$ .............................................. B60T 13/00
[52] U.S. Cl. .................................... 303/6 C; 188/349
[58] Field of Search .................. 303/6 C, 84 R, 84 A, 303/116, 115, 117, 119, 118; 188/349

[56]  References Cited

U.S. PATENT DOCUMENTS

| 3,359,725 | 12/1967 | Guettier | 303/6 C |
| 3,975,061 | 8/1976 | Kondo et al. | 303/119 |
| 4,421,362 | 12/1983 | Shirai et al. | 303/115 |

*Primary Examiner*—Duane A. Reger
*Assistant Examiner*—Alvin Oberley
*Attorney, Agent, or Firm*—James B. Raden; William J. Michals

[57]  ABSTRACT

A pressure control device to be inserted into a connection between a front wheel brake and a rear wheel brake which determines the rear brake hydraulic pressure in dependence upon front brake hydraulic pressure. The pressure control device provides a plurality of valve pistons hydraulically connected in parallel and displaceable by front axle hydraulic pressure in opposition to a control force. A predetermined change-over hydraulic pressure develops a braking pressure in the rear brake which is less than the front brake pressure. The valve pistons are provided by stepped pistons guided within stepped bores, each of which pistons provides smaller and larger effective pressure surfaces.

13 Claims, 3 Drawing Figures

PRESSURE CONTROL DEVICE

BACKGROUND OF THE INVENTION

The present invention relates to a pressure control device to be inserted into a connection between a wheel brake at the front axle and at least one wheel brake at the rear axle of an automotive vehicle, which device sets a hydraulic pressure in the wheel brake of the rear axle in dependence upon the pressure in the wheel brake of the front axle, wherein two valve pistons which are connected in parallel in respect of effect are arranged in cylinder bores displaceable by the pressure of the wheel brake of the front axle in opposition to a control force, wherein, after a proportional pressure rise in the wheel brakes upon attainment of a definable change-over pressure a pressure will be set in the wheel brake of the rear axle which is reduced in relation to the pressure in the wheel brake of the front axle.

A device incorporating the preceding features is known from U.S. Pat. No. 3,359,729. This known device comprises two valve pistons guided in cylinder bores, with each of said valve pistons being acted upon by the pressure of a master cylinder. These valve pistons are axially slidably guided in cylinder bores in a sealed relationship therewith and are loaded by compression springs which counteract the forces of the master cylinder pressure. Arranged at one of the valve pistons is a sealing member which moves into abutment on a valve seat in the presence of a predeterminable master cylinder pressure and interrupts one of the two connections between the master cylinder and the wheel brake to be controlled. After closure of this hydraulic connection, exclusively the other valve piston will now remain effective upon a further pressure increment in the master cylinder, the said valve piston projecting with an end face seal-tightly into an inlet chamber which is hydraulically connected to the master cylinder. The end face of this valve piston that is remote from the inlet chamber projects into an outlet chamber which latter forms a closed hydraulic system in conjunction with the wheel brake to be controlled. Therefore, upon a further pressure increase in the master cylinder, the valve piston will be displaced into the outlet chamber in opposition to the force of a compression spring, while there is decrease of the volume of the portion of the brake system that is connected to the wheel brake, so that a pressure rise takes place in the wheel brake which is first of all determined by the spring rate of the compression spring supporting the valve piston and which is reduced in a predetermined ratio relative to the master cylinder pressure.

It has to be regarded as a disadvantage in the pressure control device described that it is in total of relatively intricate design and that the valve seat at the one valve piston necessitates a rubber seal which is subject to natural wear.

It is therefore an object of the present invention to provide a straightforwardly designed pressure control device of the species initially referred to, wherein structurally largely identical components are used and wherein the function desired will be accomplished also in the absence of rubber-elastic sealing means.

SUMMARY OF THE INVENTION

This object will be achieved according to the present invention in that the valve pistons are designed as stepped pistons guided in stepped bores, in that the effective surfaces of the smaller-diameter piston steps are exposed to the pressure in the wheel brake of the front axle, while the effective surfaces of the larger-diameter piston steps are exposed to the pressure in the wheel brake of the rear axle, in that shaped at the smaller piston step of the first piston is a closure member for the control of a valve passage between the wheel brakes, and in that shaped at the larger piston step of the second piston is a closure member for the control of a valve passage between the wheel brake of the rear axle and an unpressurized supply reservoir. It is a particular advantage in a like design that structurally largely identical components can be utilized for the valve pistons and for the housing receiving the valve pistons, while the need for rubber-elastic and wearing sealing means is readily obviated. In particular, a simple and favourable improvement of the subject matter of this application will be accomplished, if the closure members at the piston steps form seat valves in conjunction with corresponding valve seats.

Another favourable improvement of the subject matter of the present application will be obtained in that the second stepped piston is loaded in the closing direction of its valve passage, the said application of load being adapted to be caused by a compression spring, on the one hand, while it is possible, on the other hand, to have the second stepped piston be acted upon in the closing direction of its valve passage by a variable hydraulic pressure. The absence of rubber-elastic sealing means affords in a favourable manner the possibility of utilizing the pressure control device likewise in brake slip control apparatuses in which, depending on layout and design, a more or less pulsating braking pressure is encountered. It will be suitable in this context to have the second stepped piston be acted upon in the closing direction of its valve passage by the control pressure of a brake slip control apparatus.

Furthermore, an expedient embodiment of the subject matter of the application will be obtained, if the first stepped piston is loaded in the opening direction of its valve passage. The use of a spring permits, on the one hand, to precisely define the change-over point of the pressure control device, while it is ensured, on the other hand, that the hydraulic passage between the wheel brake of the front axle and the wheel brake of the rear axle is opened in the brake's release position in any case. Suitably, this compression spring is placed between a housing shoulder and the larger piston step of the first stepped piston. Formed between the piston steps of the first stepped piston and the housing is an annular chamber which readily allows to be exposed to the control pressure of the brake slip control apparatus when using the said pressure control device within such a brake slip control apparatus. It will be possible furthermore to have a compression spring which counteracts the force of the control pressure of the brake slip control apparatus bear against the first stepped piston, the said compression spring enabling thus to conform to most various operating conditions.

It will be a particularly simple design feature, if the diameters of the larger piston steps and those of the smaller piston steps are equal in each case. A like embodiment permits to optimally simplify the necessary manufacturing means so that a pressure control device ensues that is favourable in respect of costs. Besides, it can be provided that the preload of the above-mentioned compression springs is adjustable, thereby enabling to adapt to most various vehicle characteristics even retrospectively. It will be arranged for in view of ease of manufacture of the pressure control device that the stepped bores are located paraxially in the housing. Moreover, it has proved advantageous, if a ratio of effective surfaces of 1:2 is assigned to the piston steps of each piston.

BRIEF DESCRIPTION OF THE DRAWING

Embodiments of the present invention will be explained in more detail in the following with reference to FIGS. 1 through 3. In the drawings.

DETAILED DESCRIPTION

Figure 1:
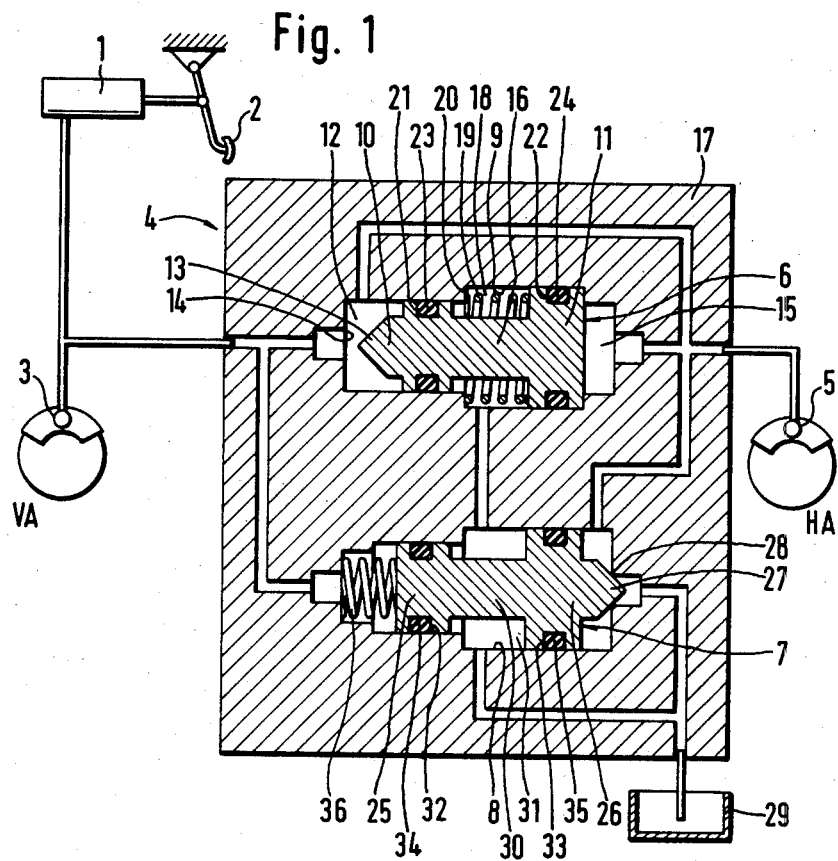
FIG. 1 is a schematic view of a pressure control device.

Parts corresponding to one another have been assigned like reference numerals.

In FIG. 1, reference numeral 1 designates a master cylinder which is actuatable by means of a brake pedal 2. Connected to the master cylinder 1 is a wheel brake 3 which is located at the front axle of an automotive vehicle. Via a pressure control device 4, the wheel brake 3 of the front axle of the automotive vehicle is in communication with a wheel brake 5 at the rear axle.

The said pressure control device 4 comprises a first stepped piston 6 as well as a second stepped piston 7 which are guided in stepped bores 8, 9. The first stepped piston 6 has a smaller-diameter piston portion 10 and a larger-diameter piston portion 11. The smaller-diameter piston portion 10 confines an inlet chamber 12 and carries a valve closure member 13 which, in cooperation with a valve seat 14, forms a first valve passage. In contrary thereto, the end face of the larger-diameter piston portion 11 serves to confine an outlet chamber 15 which is hydraulically connected to the wheel brake 5 at the rear axle of the automotive vehicle. In addition to this, there is a hydraulic connection between the inlet chamber 12 and the outlet chamber 15.

The first stepped piston 6 comprises between the piston portions 10, 11 a smaller-diameter portion 16 which, in conjunction with the housing 17, forms an annular chamber 18 accomodating a compression spring 19 which latter takes support on a housing shoulder 20, on the one hand, and on the larger-diameter piston portion 11, on the other hand, so that the first stepped piston 6 is always loaded in the opening direction of the first valve passage 13, 14. The piston portions 10, 11 of the first stepped piston 6 are provided with annular grooves 21, 22 at their peripheral surfaces which contain annular seals 23, 24.

The stepped bore 8 of the second stepped piston 7 is arranged paraxially relative to the stepped bore 9, the said second stepped piston 7 being exposed with its smaller-diameter piston portion 25 to the pressure of the wheel brake 3 of the front axle of the automotive vehicle. Shaped at the larger-diameter piston portion 26 of the second stepped piston 7 is a valve closure member 27 which, in cooperation with a valve seat 28, forms a second valve passage. The second valve passage 27, 28 serves to govern a hydraulic connection between the wheel brake 5 of the rear axle of the automotive vehicle and an unpressurized supply reservoir 29. Likewise the second stepped piston 7 has interposed between the piston portions 25, 26 a smaller-diameter portion 30 which constitutes together with the housing 17 an annular chamber 31 which corresponds to the annular chamber 18 at the first stepped piston 6. These annular chambers 18, 31 are interconnected hydraulically. The peripheral surfaces of the piston portions 25, 26 are, in turn, provided with annular grooves 32, 33 in which sealing rings 34, 35 are disposed. The second stepped piston 7 is additionally loaded by a compression spring 36 in the closing direction of the second valve passage 27, 28.

The mode of function of the pressure control device at topic will be described in more detail hereinbelow, supposing that the brake is in its released condition in which all movable parts have assumed the position to be seen from the drawing. The first valve passage 13, 14 is opened on account of the force of the compression spring 19 whereby a hydraulic connection is established between the inlet chamber 12 and the outlet chamber 15. Further, the second valve passage 27, 28 is closed on account of the force of the compression spring 36, as a result whereof the wheel brake 5 at the rear axle of the automotive vehicle is shut off in relation to the unpressurized supply reservoir 29.

When an actuating force is exerted on the brake pedal 2, hydraulic pressure will develop in the master cylinder 1 which is fed to the wheel brake 3 of the front axle of the automotive vehicle. The pressure in the wheel brake 3 propagates further to the inlet chamber 12 and flows from there via the outlet chamber 15 to the wheel brake 5 of the rear axle. The hydraulic pressure in the wheel brake 3 of the front axle acts also upon the effective surface of the piston portion 25 of the stepped piston 7 and supports the effect of the compression spring 36 so that the valve closure member 27 is urged against the valve seat 28 by a corresponding force. Consequently, the second valve passage 27, 28 is reliably in a closed position, whereby no pressure discharge is allowed to take place from the wheel brake 5 to the unpressurized supply reservoir 29.

Beside the wheel brake 5 at the rear axle of the automotive vehicle, the hydraulic pressure in the outlet chamber 15 acts likewise upon the effective surface of the larger-diameter piston portion 11 so that upon attainment of a predeterminable pressure in the wheel brake 3 and in the master cylinder 1, respectively, a pressure level will be reached at which the pressure force in the outlet chamber 15 overcomes the force of the compression spring 19 and displaces the stepped piston 6 to the left, when viewing the drawing. The valve closure member 13 of the first stepped piston 6 will finally move into abutment on the valve seat 14 so that the hydraulic connection between the inlet chamber 12 and the outlet chamber 15 is interrupted. Upon further pressure increase in the master cylinder 1, the effective surface of the first stepped piston 6 which is in first place defined by the valve seat will now be effective.

Upon attainment of a predetermined pressure in the master cylinder 1, the closure member 13 will finally lift from the seat 14 again so that an increased hydraulic pressure will propagate via the inlet chamber 12 to the inlet chamber 15 and to the wheel brake 5 of the rear axle, respectively. However, the pressure increase in the outlet chamber 15 has as a result that the first stepped piston 6 is by higher force displaced to the left, when viewing the drawing, so that the first valve passage 13, 14 will be closed again. This process of motion will be constantly repeated upon further pressure increase in the master cylinder 1 so that an amount of pressure will be produced in the wheel brake 5 of the rear axle which is reduced in relation to the pressure of the wheel brake of the front axle, the pressure reduction being dependent upon the ratio of the effective surfaces of the piston portions 10, 11 of the first stepped piston 6. In the phase of pressure build-up described, the second stepped piston 7 is in its right-hand end position, when viewing the drawing, in which the valve closure member 27 is in seal-tight abutment on the valve seat 28 and keeps the connection closed between the wheel brake 5 and the unpressurized supply reservoir 29. When the actuating force on the pedal 2 is reduced, the pressure which developed in the wheel brake 3 of the front axle of the automotive vehicle will drop as well. However, since the first valve passage 13, 14 is closed, the pressure in the outlet chamber 15 and in the wheel brake 5 of the rear axle, respectively, is not allowed to discharge directly. On the other hand, however, the pressure discharge in the wheel brake 3 of the front axle has as a consequence that the force component loading the second stepped piston in the closing direction of its second valve passage 27, 28 will be reduced so that finally a condition will be reached in which the valve closure member 27 lifts from its seat 28 and establishes a connection between the wheel brake 5 of the front axle and the unpressurized supply reservoir 29. Thus, after the second valve passage 27, 28 has opened, a corresponding reduction of the master cylinder pressure is followed by a reduction of also the pressure in the wheel brake 5 and in the outlet chamber 15 hydraulically connected to the wheel brake 5, whereby the first stepped piston 6 is caused to displace to the right, when viewing the drawing, due to the force of the compression spring, while the first valve passage 13, 14 opens and a hydraulic connection is established between the wheel brakes 3, 5. Subsequently, the second stepped piston 7 reassumes the position to be seen from the drawing, in which the second valve passage 27, 28 is closed. In the further phase of brake release, the wheel brake 5 will be pressure-relieved via the opened first valve passage 13, 14 until the brake's released position is attained.

Figure 2:
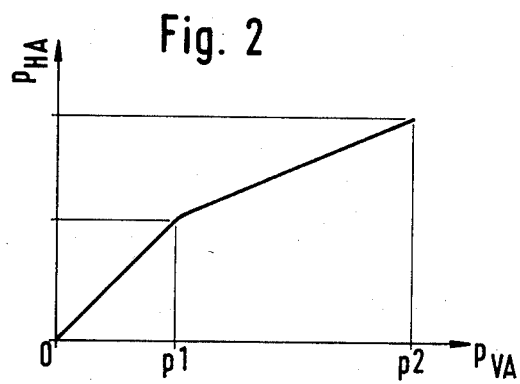
FIG. 2 is a pressure curve to be attained by the pressure control device in FIG. 1.

The pressure curve obtainable by the pressure control device described can be taken from the pressure diagram illustrated in FIG. 2. Said pressure diagram depicts the pressure of the wheel brake 5 in dependence upon the pressure of the wheel brake 3. It can be seen from the diagram that the pressures in the wheel brakes 3, 5 are equal until attainment of a pressure value p1, while in the event of a continued pressure rise in the wheel brake 3 of the front axle, a correspondingly reduced pressure will in each case develop in the wheel brake 5 of the rear axle, until finally the full braking pressure p2 has been reached.

Figure 3:
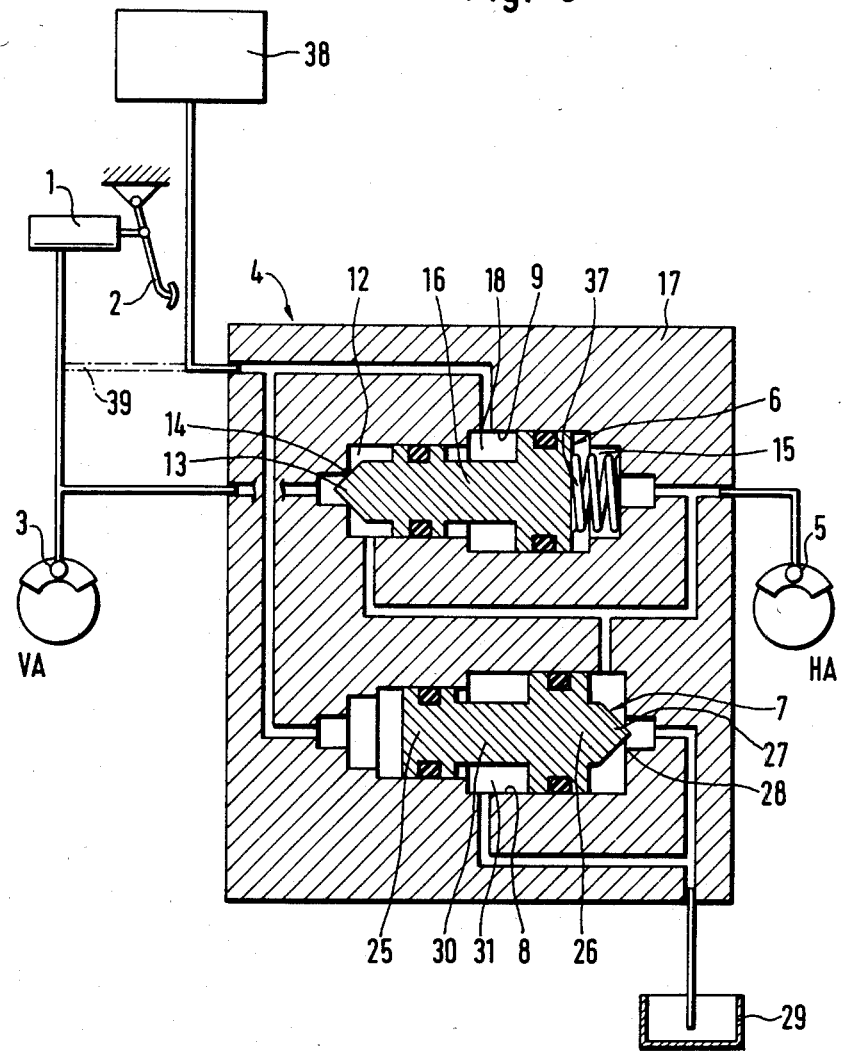
FIG. 3 is a sectional view of another pressure control device.

In comparison to the pressure control device 4, the embodiment shown in FIG. 3 includes some modifications which will be described hereinbelow. The first stepped piston 6 is loaded by a compression spring 37 towards the closing direction of its valve passage 13, 14. However, no spring is provided in the annular chamber 18. Moreover, the brake system illustrated in FIG. 3 shows schematically a pressure control device 38 which supplies a control pressure to the annular chamber 18 which is dependent on the wheel slip. Likewise the effective surface of the smaller piston portion 25 of the stepped piston 7 is loaded by this control pressure. Further, the interrupted line 39 indicates that the slip-responsively acting pressure control device 38, too, takes influence on the pressure in the wheel brake 3 of the front axle of the automotive vehicle.

The mode of function of the brake system illustrated in FIG. 3 is mostly identical with the mode of function described in connection with FIG. 1. Differences consist exclusively in that the first stepped piston 6 is not loaded by the force of a compression spring, but by a hydraulic pressure, in the opening directon of its valve passage 13, 14. The effect of the control pressure in the annular chamber 18 is counteracted by a compression spring 37 which enables to adapt to individual vehicle conditions. Also the effective surface of the smaller piston portion 25 of the second stepped piston 7 will not be loaded by a compression spring now, but likewise by the control pressure of the slip-responsively operating control device 38. The brake system illustrated in FIG. 3 allows to achieve a pressure curve which qualitatively corresponds to the pressure curve illustrated in FIG. 2. In dependence upon the control pressure of the slip-responsively operating pressure control device 38, a shifting of the break in the curve at the pressure p1 will result, however, according to the magnitude of pressure.

What is claimed is:

1. A pressure control device for insertion into a connection between a wheel brake at the front axle and at least one wheel brake at the rear axle of an automotive vehicle and which sets a hydraulic pressure in the wheel brake of the rear axle as a function of the pressure in the wheel brake of the front axle, wherein two valve pistons which are connected in parallel are arranged in cylinder bores and are displaceable by the pressure of the wheel brake of the front axle in opposition to a control force and wherein after a proportional pressure rise in the wheel brakes upon attainment of a definable change-over pressure a pressure is set in the wheel brake of the rear axle which is reduced relative to the pressure in the wheel brake of the front axle, wherein the valve pistons (6, 7) are provided as stepped pistons guided in stepped bores (8, 9) wherein the effective surfaces of the smaller-diameter pistons steps (10, 25) are exposed to the pressure in the wheel brake (3) of the front axle while the effective surfaces of the larger-diameter piston steps (11, 26) are exposed to the pressure in the wheel brake (5) of the rear axle and wherein a shaped closure member (13) is provided at the smaller piston step (10) of the first piston (6) for the control of a first valve passage between the front and rear wheel brakes (3, 5), and a closure member (27) is provided at the larger piston step (26) of the second piston (7) for the control of a second valve passage between the wheel brake (5) of the rear axle and an unpressurized supply reservoir (29).

2. A pressure control device as claimed in claim 1, wherein the closure members (13, 27) as the piston steps (10, 26) form seat valves in conjunction with corresponding valve seats (14, 28).

3. A pressure control device as claimed in claim 1, wherein the second stepped piston (7) is loaded in the closing direction of said second valve passage.

4. A pressure control device as claimed in claim 3, wherein the second stepped piston (7) is loaded by a compression spring (36).

5. A pressure control device as claimed in claim 3, wherein the second stepped piston (7) is loaded in the closing direction of said second valve passage by a variable hydraulic pressure.

6. A pressure control device as claimed in claim 5, wherein the variable hydraulic pressure is the control pressure of a brake slip control apparatus (38).

7. A pressure control device as claim in claim 3, wherein the first stepped piston (6) is loaded in the opening direction of said second valve passage.

8. A pressure control device as claimed in claim 7, wherein a compression spring (19) is arranged between a housing (17) and the larger piston step (11) of the first stepped piston (6).

9. A pressure control device as claimed in claim 1, wherein an annular chamber (18) is formed between the piston steps (19, 11) of the first stepped piston (6) and a housing (17) which annular chamber is supplied with the control pressure from a brake slip control apparatus (38).

10. A pressure control device as claimed in claim 9, wherein a compression spring (37) which counteracts the force of the control pressure abuts on the first stepped piston (6).

11. A pressure control device as claimed in claim 10, wherein the diameters of the larger piston steps (11, 26) and those of the smaller piston steps (19, 25) are alike.

12. A pressure control device as claimed in claim 11, wherein the stepped bores (8, 9) are located paraxially in the housing (17).

13. A pressure control device as claimed in claim 12, wherein a ratio of effective surfaces 1:2 is assigned to the piston steps (10, 11; 25, 26) of each piston (6, 7).

* * * * *